US006610774B2

(12) United States Patent
Maekawa et al.

(10) Patent No.: US 6,610,774 B2
(45) Date of Patent: Aug. 26, 2003

(54) AQUEOUS DISPERSION

(75) Inventors: Kazuhiko Maekawa, Tuckahoe, NY (US); Mototsugu Yoshihara, Okayama-Prefecture (JP); Mitsuru Kato, Okayama-Prefecture (JP); Yukio Itoshima, Okayama-Prefecture (JP); Mamoru Omoda, Okayama-Prefecture (JP); Yukiatsu Komiya, Okayama-Prefecture (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/893,891

(22) Filed: Jun. 29, 2001

(65) Prior Publication Data

US 2002/0040098 A1 Apr. 4, 2002

(30) Foreign Application Priority Data

Jun. 29, 2000 (JP) ........................................ 2000-196818
Jun. 29, 2000 (JP) ........................................ 2000-196819
Jan. 23, 2001 (JP) ........................................ 2001-013941

(51) Int. Cl.$^7$ ...................... C08F 293/00; C09D 153/00
(52) U.S. Cl. ........................ 524/500; 524/501; 524/504; 524/505; 524/507; 524/556; 525/92 R; 525/92 C; 525/93
(58) Field of Search .............................. 525/92 R, 92 C, 525/93; 524/500, 501, 504, 505, 507, 556

(56) References Cited

U.S. PATENT DOCUMENTS 6,096,435 A 8/2000 Maekawa et al.

FOREIGN PATENT DOCUMENTS

| JP | 01-256556 | 10/1989 |
|----|-----------|---------|
| JP | 04-218548 | 8/1992 |
| JP | 060493150 | 2/1994 |
| JP | 2000007860 | 1/2000 |
| JP | 2000-34388 | 2/2000 |
| WO | WO 01/07518 | 2/2001 |

*Primary Examiner*—Jeffrey C. Mullis
(74) *Attorney, Agent, or Firm*—Oblon, Spivak, McClelland, Maier & Neustadt, P.C.

(57) ABSTRACT

The invention provides an aqueous dispersion which includes i) an aqueous dispersion (I) resulting from dispersion of a block copolymer (I) composed of at least one polymer block (A) containing olefin monomer units and at least one polymer block (B) containing 2 to 100 mole percent of units derived from at least one vinyl monomer having a carboxyl or carboxylic anhydride group and 98 to 0 (zero) mole percent of units derived from another vinyl monomer or monomers copolymerizable with the carboxyl group- or carboxylic anhydride group-containing vinyl monomer, in an aqueous solution of not less than 0.05 equivalent, relative to the carboxyl or carboxylic anhydride group, of a basic substance, and ii) a polyurethane (II), iii) vinyl polymer (III) or iv) tackifier (IV) incorporated in the aqueous dispersion (I). The aqueous dispersion of the invention has excellent adhesiveness to various substrates and stability, and gives a coating layer having excellent weather resistance, water resistance and resistance to solvent attack. The aqueous dispersion of the invention is particularly useful as a coating composition and/or a primer.

25 Claims, No Drawings

AQUEOUS DISPERSION

BACKGROUND OF THE INVENTION

1. Field of the Invention

The present invention relates to an aqueous dispersion of a block copolymer. The aqueous dispersion of the invention has good adhesiveness, especially airtight adhesiveness, to various substrates, and has good stability. In addition, the aqueous dispersion of the invention gives a coating layer of good properties in water resistance, weather resistance, gloss and resistance to solvent attack.

2. Discussion of the Background

Polyolefins such as polypropylene have good properties including processability, water resistance and oil resistance, and are inexpensive. Therefore, they are widely used for plastics for electric and electronic appliances for household use and for automobile parts. In some cases, polyolefins are made into moldings coated with paint or made into laminates with other resins. However, due to their low polarity, polyolefins have a problem that they are poorly adhesive to ordinary paint and to other resins.

To solve the problem, it has been tried that the surface of polyolefin moldings are treated with chromic acid, flame, corona discharge, plasma, solvent, etc. to increase the polarity of the surface of the moldings and to improve the adhesiveness thereof to paint and other resins. However, the treatment requires complicated working steps and requires a large amount of corrosive chemicals, and is therefore often dangerous.

Under such situation, a method of applying a primer that comprises, as the essential ingredient, a chlorinated polyolefin to the surface of polyolefin moldings has been proposed. However, the chlorinated polyolefin is usually used as a solution in an aromatic organic solvent, such as toluene and xylene, which is harmful to human. Therefore, the use of a primer comprising chlorinated polyolefin is undesirable in view of environmental safety. A method of dispersing such a chlorinated polyolefin in water has been proposed (see Japanese Patent Laid-open Nos. 256556/1989 and 218548/1992). Even in this method, however, it is still difficult to prepare the aqueous dispersion without using such an aromatic organic solvent at all. In addition, the weather resistance and water resistance of the coating layer formed by the aqueous dispersion is poor.

Furthermore, aqueous dispersion type adhesive compositions free of a chlorinated substance are desired from the viewpoint of recycling or suppression of a hydrogen chloride gas generation upon waste incineration, etc.

SUMMARY OF THE INVENTION

One object of the present invention is to provide an aqueous dispersion which has good adhesiveness, especially airtight adhesiveness to various substrates, good stability, and results in a coating layer having excellent water resistance, weather resistance and the like.

The present invention provides an aqueous dispersion which includes i) an aqueous dispersion (I) of a block copolymer (I) comprising at least one polymer block (A) containing olefin monomer units and at least one polymer block (B) containing 2 to 100 mole percent of units derived from at least one vinyl monomer having a carboxyl or carboxylic anhydride group and 98 to 0 (zero) mole percent of units derived from another vinyl monomer or monomers copolymerizable with the carboxyl group- or carboxylic anhydride group-containing vinyl monomer, in an aqueous solution of not less than 0.05 equivalent, relative to the carboxyl or carboxylic anhydride group, of a basic substance, and ii) a polyurethane (II) incorporated in the aqueous dispersion (I).

The invention also provides an aqueous dispersion which includes i) an aqueous dispersion (I) of a block copolymer (I) comprising at least one polymer block (A) containing olefin monomer units and at least one polymer block (B) containing 2 to 100 mole percent of units derived from at least one vinyl monomer having a carboxyl or carboxylic anhydride group and 98 to 0 (zero) mole percent of units derived from another vinyl monomer or monomers copolymerizable with the carboxyl group- or carboxylic anhydride group-containing vinyl monomer, in an aqueous solution of not less than 0.05 equivalent, relative to the carboxyl or carboxylic anhydride group, of a basic substance, and iii) an aqueous dispersion or an aqueous solution (III) of a vinyl polymer (III) incorporated in the aqueous dispersion (I).

The invention further provides an aqueous dispersion which includes i) an aqueous dispersion (I) of a block copolymer (I) comprising at least one polymer block (A) containing olefin monomer units and at least one polymer block (B) containing 2 to 100 mole percent of units derived from at least one vinyl monomer having a carboxyl or carboxylic anhydride group and 98 to 0 (zero) mole percent of units derived from another vinyl monomer or monomers copolymerizable with the carboxyl group- or carboxylic anhydride group-containing containing vinyl monomer, in an aqueous solution of not less than 0.05 equivalent, relative to the carboxyl or carboxylic anhydride group, of a basic substance, and iv) a tackifier (IV) incorporated in the aqueous dispersion (I).

DETAILED DESCRIPTION OF THE PREFERRED EMBODIMENTS

A more complete appreciation of the invention and many of the attendant advantages thereof will be readily obtained as the same becomes better understood by reference to the following detailed description of the preferred embodiments of the invention.

PCT application No. PCT/JP00/04731, the entire contents of which are hereby incorporated by reference refers to an aqueous dispersion obtained by dispersing a block copolymer comprising a polymer block (A) consisting mainly of olefin monomer units and polymer block (B) comprising 2 to 100 mol % units of a vinyl monomer having a carboxyl group or a carboxylic anhydride group and 98 to 0 mol % units of another vinyl monomer copolymerizable with the vinyl monomer, into an aqueous solution of a basic substance, which is contained in an amount of at least 0.05 equivalents to the carboxyl groups or carboxylic anhydride groups.

The present inventors have found that addition of a specific component to the aqueous dispersion of the PCT application leads to an improvement of the adhesiveness of the aqueous dispersion to various substrates and leads to an improvement of water resistance and resistance to solvent attack of the coating layer obtained from the aqueous dispersion.

The block copolymer (I) used in the invention is composed of polymer blocks (A) and polymer blocks (B) mentioned below. The block copolymer (I) includes, for example, AB-type diblock copolymer, ABA-type triblock copolymer, BAB-type triblock copolymer, etc. Of those, preferred is the AB-type diblock copolymer.

Preferably, the polymer blocks (A) that constitute the block copolymer (I) consist essentially of olefin monomer units. The olefin monomer unit content of the polymer blocks (A) preferably falls between 50 and 100 mol %, more preferably between 70 and 100 mol %, even more preferably between 80 and 100 mol %, based on the number of mols of all the constituent units of the polymer blocks (A). The most preferable olefin monomer unit content of the polymer blocks (A) is 100 mol %. These ranges include 60, 65, 75, 85, 90 and 95 mol %

The olefin monomer units include, for example, those derived from ethylene; α-olefins such as propylene, 1-butene, 2-methyl-1-butene, 3-methyl-1-butene, 1-pentene, 4-methyl-1-pentene, 1-hexene, 1-octene, 1-decene, 1-octadecene, etc.; 2-butene; isobutylene; conjugated dienes such as butadiene, isoprene, etc.; cyclopentadiene, vinylcyclohexane, β-pinene, etc. The polymer block (A) may contain one or more of these units. Preferably, the polymer block (A) contains units derived from ethylene or propylene.

In case where the olefin monomer units are derived from conjugated dienes such as butadiene, isoprene, cyclopentadiene, etc., the remaining unsaturated bonds may be hydrogenated.

The polymer block (A) may optionally contain from 0 to 50 mol % of units derived from vinyl comonomers capable of copolymerizing with the olefin monomers. The comonomer content of the polymer block (A) preferably falls between 0 and 30 mol %, more preferably between 0 and 20 mol %. These ranges include 1, 5, 10, 15, 25, 35 and 45 mol %.

The vinyl comonomers capable of copolymerizing with the olefin monomers include, for example, (meth) acrylonitrile; vinyl esters such as vinyl acetate, vinyl pivalate, etc.; (meth)acrylates such as methyl (meth) acrylate, ethyl (meth)acrylate, butyl (meth)acrylate, dodecyl (meth)acrylate, 2-ethylhexyl (meth)acrylate, etc.; (meth) acrylamide, N-vinyl-2-pyrrolidone, etc. One or more of these comonomers may be copolymerized with the olefin monomers. Of those, preferred are methyl acrylate, ethyl acrylate, and acrylonitrile.

The polymer blocks (B) that constitute the block copolymer (I) contain vinyl monomer units having a carboxyl group or a carboxylic acid anhydride group. The vinyl monomer unit content of the polymer blocks (B) falls between 2 and 100 mol % based on the number of mols of all the constituent units of the polymer blocks (B). In view of the water resistance of the coating layer obtained from the aqueous dispersion of the invention, the vinyl monomer unit content of the polymer blocks (B) is preferably between 2 and 50 mol %, more preferably between 2 and 45 mol %, still more preferably between 2 and 30 mol %, based on the number of mols of all the constituent units of the polymer blocks (B). These ranges include 5, 10, 15, 25, 35 and 40 mol %.

The vinyl monomers having a carboxyl group include acrylic acid, methacrylic acid, crotonic acid, cinnamic acid, itaconic acid, maleic acid etc. The polymer block (B) may contain one or more of monomer units derived from these vinyl monomers. Of those, preferred are acrylic acid and methacrylic acid.

The vinyl monomers having a carboxylic acid anhydride group (represented by —CO—O—CO—) include maleic anhydride, itaconic anhydride, citraconic anhydride, butenylsuccinic anhydride, tetrahydrophthalic anhydride, etc. The polymer block (B) may contain one or more of monomer units derived from these vinyl monomers. Of those, preferred is maleic anhydride.

The polymer blocks (B) may contain from 0 to 98 mol %, preferably from 50 to 98 mol %, more preferably from 55 to 98 mol %, still more preferably from 70 to 98 mol %, based on the number of mols of all the constituent units of the polymer blocks (B), units of other vinyl comonomers capable of copolymerizing with the vinyl monomers having a carboxyl group or a carboxylic acid anhydride group. These ranges include 1, 2, 5, 25, 35, 45, 65, 75, 85 and 95 mol %. The vinyl comonomers include styrenic monomers such as styrene, 4-styrenesulfonic acid and its sodium or potassium salt etc.; (meth)acrylonitrile; vinyl esters such as vinyl acetate, vinyl pivalate, etc.; (meth)acrylates such as methyl (meth)acrylate, ethyl (meth)acrylate, butyl (meth) acrylate, dodecyl (meth)acrylate, 2-ethylhexyl (meth) acrylate, etc.; (meth)acrylamide, N-vinyl-2-pyrrolidone, etc. One or more of these comonomers may be copolymerized with the vinyl monomers. Of those, preferred are methyl (meth)acrylate, ethyl (meth)acrylate, styrene, and acrylonitrile.

The number-average molecular weight of the polymer blocks (A) falls preferably between 1,000 and 100,000, more preferably between 1,000 and 20,000, in view of the preparation of uniform aqueous dispersion. The number-average molecular weight of the polymer blocks (B) falls preferably between 1,000 and 100,000, more preferably between 1,000 and 20,000, in view of the preparation of uniform aqueous dispersion. Also preferably, the number-average molecular weight of the block copolymer (I) falls between 2,000 and 200,000, more preferably between 2,000 and 40,000. The number-average molecular weight of polymer (blocks) referred to herein is determined through gel permeation chromatography (GPC), based on the standard polystyrene calibration curve.

The weight ratio of the polymer block (A) based on the polymer block (B) falls preferably between 3/1 and 1/3, more preferably between 2/1 and 1/2. These ranges include 2.5/1, 1.5/1, 1/1, 1/1.5 and 1/2.5.

The block copolymer (I) can be produced, for example, by radical-polymerizing the monomer component to constitute the polymer blocks (B), in the presence of the polymer blocks (A) having a mercapto group at the terminal. According to the method, the block copolymer (I) having an intended number-average molecular weight and an intended molecular weight distribution can be produced in a simple and efficient manner.

The polymer blocks (A) having a mercapto group at the terminal can be produced through various methods. For example, it can be produced by a method of adding thio-S-acetic acid, thio-S-benzoic acid, thio-S-propionic acid, thio-S-butyric acid, thio-S-valeric acid or the like to a olefin polymer having a double bond at the terminal, followed by the treatment of the resulting polymer adduct with acid or alkali; or by a method of using ethylene sulfide as a polymerization terminator in producing polyolefin through anion polymerization.

In some cases, addition of olefin polymer to the aqueous dispersion (I) leads to an improvement of the strength of a coating layer obtained from the aqueous dispersion of the invention. The amount of the olefin polymer in the aqueous dispersion of the invention falls between 1 to 200 parts by weight relative to 100 parts by weight of the block copolymer (I). The amount of the olefin polymer falls preferably between 1 and 100 parts by weight, more preferably between 1 and 50 parts by weight, relative to 100 parts by weight of the block copolymer (I), in view of the balance of the stability of the aqueous dispersion of the invention and the strength of the coating layer obtained from the aqueous dispersion of the invention. If the amount of the olefin polymer is larger than 200 parts by weight, relative to 100 parts by weight of the block copolymer (I), the mean particle size of the matters dispersed in the aqueous dispersion of the invention will be large, and the stability of the aqueous dispersion of the invention will be decreased. These ranges include 2, 5, 10, 25, 75, 125, 150 and 175 parts by weight.

The olefin polymer includes low-density polyethylene, middle-density polyethylene, high-density polyethylene, very-low-density polyethylene, linear low-density polyethylene, polypropylene, ethylene-vinyl acetate copolymers, ethylene-ethyl acrylate copolymers, ethylene-methyl acrylate copolymers, propylene-α-olefin copolymers, ethylene-α-olefin copolymers, ethylene-propylene-diene (or triene) ter-copolymers, etc. The aqueous dispersion may contain one or more of these olefin polymers. α-olefins in the ethylene-α-olefin copolymers include propylene, 1-butene, 1-pentene, 1-hexene, 4-methyl-1-pentene, 1-octene, 1-decene, etc. Dienes (or trienes) in the ethylene-propylene-diene (or triene) ter-copolymers include linear non-conjugated dienes such as 1,4-hexadiene, 1,6-octadiene, 2-methyl-1,5-hexadiene, 6-methyl-1,6-heptadiene, 7-methyl-1,6-octadiene, etc.; cyclic non-conjugated dienes such as cyclohexadiene, dichloropentadiene, methyltetrahydroindene, 5-vinylnorbornene, 5-ethylidene-2-norbornene, 5-methylene-2-norbornene, 5-isopropylidene-2-norbornene norbornene, 6-chloromethyl-5-isopropenyl-2-norbornene, etc.; trienes such as 2,3-diisopropylidene-5-norbornene, 2-ethylidene-3-isopropylidene-5-norbornene, 2-propenyl-2,2-norbornadiene, 1,3,7-octatriene, 1,4,9-decatriene, etc.

The olefin polymers may be modified. The modification may be effected by various known methods of halogenation such as chlorination or bromination, or chlorosulfonation, epoxidation, hydroxylation, addition of an acid anhydride, carboxylation, etc.

The aqueous dispersion (I) can be produced by dispersing the block copolymer (I) optionally along with an olefin polymer, in an aqueous solution of at least 0.05 equivalents, relative to the carboxyl group or the carboxylic acid anhydride group in the polymer blocks (B) of the block copolymer (I), of a basic substance, at a temperature not lower than the melting point of the block copolymer (I). In case where the aqueous dispersion (I) contains the olefin polymer, the block copolymer (I) and the olefin polymer are dispersed in the aqueous solution at a temperature not lower than the melting point of either one of the two having a higher melting point. If they are dispersed in the aqueous solution at a temperature lower than the indicated melting point, the mean particle size of the matters dispersed is large and the stability of the aqueous dispersion (I) is low.

The aqueous dispersion (I) can be produced with a pressure container equipped with a stirrer. Preferred stirrers are turbine stirrers, colloid mills, homomixers and homogenizers, because they can effect large shear force. Also, the aqueous dispersion (I) can be produced with a line-type mixer equipped with a stirrer or a line-type mixer such as "Static Mixer" (trade name; product by Noritake Co., Ltd.).

The basic substance includes ammonia; ammonium hydroxide; amine compounds such as hydroxylamine, hydrazine, hydrazine hydrate, (di)methylamine, (di)ethylamine, (di)propylamine, (di)butylamine, (di) hexylamine, (di)octylamine, (di)ethanolamine, (di) propanolamine, N-methyldiethanolamine, triethylamine, N,N-dimethylethanolamine, N,N-diethylethanolamine, 2-dimethylamino-2-methyl-1-propanol, 2-amino-2-methyl-1-propanol, cyclohexylamine, tetramethylammonium hydroxide, etc.; metal oxides such as sodium oxide, sodium peroxide, potassium oxide, potassium peroxide, calcium oxide, strontium oxide, barium oxide, etc.; metal hydroxides such as sodium hydroxide, potassium hydroxide, calcium hydroxide, strontium hydroxide, barium hydroxide, etc.; metal hydrides such as sodium hydride, potassium hydride, calcium hydride, etc.; carbonates such as sodium carbonate, potassium carbonate, sodium hydrogencarbonate, potassium hydrogencarbonate, calcium hydrogencarbonate, etc.; acetates such as sodium acetate, potassium acetate, calcium acetate, etc. Of those, preferred are ammonia, (di) methylamine, (di)ethylamine, (di)propylamine, (di) butylamine, N-methyldiethanolamine, triethylamine, N,N-dimetylethanolamine, N,N-diethylethanolamine, 2-dimethylamino-2-methyl-1-propanol, 2-amino-2-methyl-1-propanol, sodium hydroxide and potassium hydroxide, in view of their availability and of the stability of the aqueous dispersion; and more preferred are ammonia, N,N-dimethylethanolamine, sodium hydroxide and potassium hydroxide.

These basic substances are usually used in the form of an aqueous solution. The amount of the basic substance is at least 0.05 equivalent relative to the carboxyl group or carboxylic anhydride group in the polymer blocks (B) of the block copolymer (I). The amount of the basic substance is preferably from 0.2 to 5.0 equivalent, more preferably from 0.3 to 1.5 equivalent relative to the carboxyl group or carboxylic anhydride group in the polymer blocks (B) of the block copolymer (I), in order to further reduce the particle size of the matters dispersed. These ranges include 0.1, 0.5, 1.0, 2, 2.5, 3, 3.5, 4 and 4.5 equivalent. Here, 1 equivalent for 1 mol of carboxylic group means 1 mol equivalent of the basic substance, and 1 equivalent for 1 mol of carboxylic anhydride group means 2 mols equivalent of the basic substance.

Preferably, the ratio of the block copolymer (I) to the aqueous solution of the basic substance is such that the amount of the block copolymer (I) falls between 5 and 70 parts by weight while that of the aqueous solution of the basic substance falls between 95 and 30 parts by weight. These ranges include 10, 20, 25, 35, 45, 55, 65, 75 and 85 as appropriate.

The aqueous dispersion of the invention can be produced by incorporating a polyurethane (II) into the aqueous dispersion (I) of the block copolymer (I). The method of incorporation of polyurethane (II) into the aqueous dispersion (I) is not particularly restricted. For example, an aqueous dispersion or an aqueous solution (II) of polyurethane (II) may be added to the aqueous dispersion (I). Also, the aqueous dispersion of the invention can be produced by dispersing the block copolymer (I) and polyurethane (II) simultaneously in the aqueous medium.

The aqueous dispersion or the aqueous solution of polyurethane (II) may be any of those known in the art. They include, for example, (1) an aqueous dispersion of polyurethane obtained by subjecting a carboxyl group-containing prepolymer having an isocyanato group at the terminal, which is the product of the reaction of an organic polyisocyanate, a high-molecular polyol and a carboxyl group-containing polyol, to the neutralization with a tertiary amine or the like to give an aqueous dispersion of the neutralized prepolymer and further reacting the neutralized prepolymer with a chain extender such as a polyamine, (2) an aqueous dispersion of polyurethane obtained by dispersing a prepolymer having an isocyanato group at the terminal, which is the product of a reaction of an organic polyisocyanate and a high-molecular polyol, in water in the presence of a surfactant and further reacting the prepolymer with a chain extender such as a polyamine, (3) an aqueous dispersion of polyurethane obtained by subjecting a carboxyl group-containing polyurethane, which is the product of the reaction of an organic polyisocyanate, a high-molecular polyol, a carboxyl group-containing polyol and a chain extender, to the neutralization with a tertiary amine or the like, and (4) an aqueous solution or an aqueous dispersion of an polyoxyalkylene group-containing polyurethane obtained by reacting an organic polyisocyanate, a polyoxyalkylene glycol-containing high-molecular polyol and a chain extender. Also, (5) an aqueous dispersion of a composite polyurethane obtained by subjecting a vinyl monomer to emulsion polymerization in one of the aqueous dispersion of polyurethane described above (1) to (3) can be used as the polyurethane (II).

The organic polyisocyanates to produce the polyurethane (II) can be diisocyanates conventionally used in the production of polyurethane. Examples of usable diisocyanates are those having a molecular weight of not more than 500, such as aromatic diisocyanates, e.g. 4,4'-diphenylmethane diisocyanate, 1,4-phenylene diisocyanate, tolylene 2,4-diisocyanate, tolylene 2,6-diisocyanate, xylylene diisocyanate, tetramethylxylylene diisocyanate and 1,5-naphthalene diisocyanate; alycyclic diisocyanates, e.g. isophorone diisocyanate, 4,4'-dicyclohexylmethane diisocyanate and norbornene diisocyanate; and aliphatic diisocyanates, e.g. hexamethylene diisocyanate. One or more of these diisocyanates may be used. Also, polyfuctionalized isocyanates, e.g. trimer of hexamathylene diisocyanate, can be used together with the diisocyanate.

The high-molecular polyols to produce the polyurethane (II) can include, for example, polyether polyols such as poly(ethylene glycol), poly(propylene glycol), poly(tetramethylene glycol) and poly(methyltetramethylene glycol); polyester polyols such as poly(butylene adipate)diol, poly(butylene sebacate)diol, poly(hexamethylene adipate)diol, poly (3-methyl-1,5-pantylene adipate)diol, poly(3-methyl-1,5-pentylene sebacate)diol, polycaprolactone diol and poly(β-methyl-δ-valerolactone)diol; polycarbonate (based) diols such as poly(hexamethylene carbonate) diol and poly(3-methyl-1,5-pentylene carbonate)diol; polyester-polycarbonate polyol; polyolefin polypls such as polyethylene polyol, polypropylene polyol, polyisobutene polyol, polybutadiene polyol, hydrogenated product of polybutadiene polyol, polyisoprene polyol and hydrogenated product of polyisoprene polyol.

The high-molecular polyol preferably has a number-average molecular weight of 300 to 10,000, more preferably 400 to 8,000, still more preferably 500 to 6,000. The "number-average molecular weight" of a high-molecular polyol referred to herein means the number-average molecular weight calculated based on the hydroxyl value determined according to JIS K 1577, incorporated herein by reference. The high-molecular polyol preferably has 1 to 3 hydroxyl groups per molecule thereof.

The chain extender to produce the polyurethane (II) may be any and every one that is generally used in producing ordinary polyurethanes. Preferred are low-molecular compounds having a molecular weight of 300 or less and having two or more active hydrogen atoms capable of reacting with isocyanato group in the molecule. The chain extender includes, for example, diols such as ethylene glycol, propylene glycol, 1,4-butanediol, 1,6-hexanediol, 1,4-bis(β-hydroxyethoxy)benzene, 1,4-cyclohexanediol, bis(β-hydroxyethyl) terephthalate and xylylene glycol; triols such as trimetylolpropane; pentaols such as pentaerythritol; diamines such as hydrazine, ethylenediamine, propylenediamine, hexamethylenediamine, nonamethylenediamine, xylylenediamine, isophoronediamine, piperazine, piperazine derivatives, phenylenediamine, tolylenediamine, xylenediamine, adipic acid dihydrazide and isophthalic acid dihydrazide; aminoalcohols such as aminoethyl alcohol and aminopropyl alcohol. One or more of these can be used. Among them, diamines such as hydrazine, ethylenediamine, piperazine, adipic acid dihydrazide and isophthalic acid dihydrazide are preferred. Also, monoamines such as n-butylamine, 4-aminobutanoic acid and 6-aminohexanoic acid can be used together with a chain extender of polyfunctional amine.

Polyurethane (II) preferably has neutralized carboxyl groups so that it may be dispersed or dissolved in water. Polyurethane (II) having neutralized carboxyl groups can be obtained by using, in the polyurethane formation reaction, a compound having a carboxyl group, which may be a salt form thereof, and at least one active hydrogen atom such as a hydroxyl or amino group, and, if necessary, by neutralizing the formed polyurethane with a basic substance such as a tertiary amine or alkali metal hydroxide. A compound having a carboxyl group and at least one active hydrogen atom can include, for example, 2,2-dimethylolpropionic acid, 2,2-dimethylolbutyric acid and 2,2-dimethylolvaleric acid. Also usable are polyester polyols, polyester polycarbonate polyols or the like obtained by copolymerizing the above compound. Preferred polyurethane (II) is obtained by the method which comprises producing a polyurethane prepolymer using 2,2-dimethylolpropionic acid or 2,2-dimethylolbutyric acid, and, after completion of the prepolymer formation, neutralizing the prepolymer with a basic substance such as trimethylamine, triethylamine, N,N-dimethylethanolamine, N,N-diethylethanolamine or N-methyldiethanolamine to convert the carboxyl group of the prepolymer into a carboxylic acid salt.

Preferred polyurethane (II) is a polyurethane having a monovalent or divalent aliphatic hydrocarbon group containing 50 to 1,000 carbon atoms and/or a composite polyurethane obtained by polymerizing a vinyl monomer in the presence of a polyurethane, which is previously described in (5), since it shows improved compatibility with block copolymers (I) and provides an aqueous dispersion of the invention having better adhesion properties.

The polyurethanes having a monovalent or divalent aliphatic hydrocarbon group containing 50 to 1,000 carbon atoms are, for example, polyurethanes produced by using a polyolefin polyol having 50 to 1000 carbon atoms such as mentioned above. The content of the aliphatic hydrocarbon group is preferably 10 to 50% by weight, more preferably 15 to 45% by weight, still more preferably 20 to 40% by weight, on the whole polyurethane. These ranges include 12, 14, 18, 22, 25, 30, 35 and 48%.

The composite polyurethanes are, for example, those obtained by polymerizing a vinyl monomer in the presence of a polyurethane. The production method thereof can include, for example, the method which comprises subjecting a vinyl monomer to emulsion polymerization in an aqueous dispersion or a aqueous solution of a polyurethane and the method which comprises polymerizing a vinyl monomer in the presence of a polyurethane and then dispersing or dissolving the product in water. Usable vinyl monomers are those mentioned above as raw materials for polymer blocks (B) of the block copolymers (I). The amount of the vinyl monomer is preferably 10 to 90% by weight, more preferably 20 to 80% by weight, still more preferably 30 to 70% by weight, based on the whole polyurethane (II). These ranges include 15, 25, 35, 45, 55, 65, 75 and 85%.

The aqueous dispersion or aqueous solution of polyurethane (II) may contain a surfactant. For attaining better adhesiveness to various substrates, however, the amount of a surfactant is preferably not more than 10 parts by weight, more preferably not more than 5 parts by weight, still more preferably not more than 3 parts by weight, per 100 parts by weight of polyurethane (II). These ranges include 0, 1, 2, 4, 6, 7, 8 and 9 parts by weight.

The weight ratio of the sum of the solid matter, which is the polymer component such as block copolymer (I) and, if present, olefin polymer, in the aqueous dispersion (I) to the polyurethane (II) is appropriately within the range of 10:90 to 90:10. When the polyurethane (II) is used in amounts less than 10 parts by weight per 100 parts by weight of the sum of the solid matter in the aqueous dispersion (I) and the polyurethane (II), the coating layer obtained from the aqueous dispersion of the invention may show decreased adhesiveness or wear resistance. On the other hand, when the polyurethane (II) is used in amounts exceeding 90 parts by weight, the aqueous dispersion of the invention may show decreased adhesiveness to polyolefin materials and/or decreased water resistance. These ranges include 15, 20, 25, 30, 35, 45, 50, 55, 65, 75 and 85 as appropriate.

Crosslinkable set of functional groups may be introduced into both of the block copolymer (I) and polyurethane (II). The combination of crosslinkable functional groups can include, for example, the combination of hydrazide and carbonyl groups, the combination of epoxy and carboxyl groups, the combination of cyclocarbonate and carbonyl groups and the combination of silanol and silanol groups. Thus, for example, an aqueous dispersion of a carbonyl group-containing block copolymer (I) may be used in combination with an aqueous dispersion or an aqueous solution of a hydrazide group-containing polyurethane (II).

Further, the aqueous dispersion of the invention can be produced by incorporating an aqueous dispersion or an aqueous solution (III) of a vinyl polymer (III) into the aqueous dispersion (I) of the block copolymer (I). The method of incorporation of an aqueous dispersion or an aqueous solution (III) of a vinyl polymer (III) into the aqueous dispersion (I) is not particularly restricted. For example, an aqueous dispersion or an aqueous solution (III) of a vinyl polymer (III) may be added to the aqueous dispersion (I).

The vinyl polymer (III) can be obtained, for example, by subjecting at least one polymerizable vinyl monomer to radical polymerization using a radical polymerization initiator in an aqueous medium in the presence of an emulsifier and, if necessary, in the presence of an additive such as molecular weight modifier, water-soluble high-molecular compound, inorganic compound, etc. Generally, the polymerization of the vinyl monomer is carried out at a temperature of 30 to 90° C. and a pressure within the range of atmospheric pressure to 5 MPa for 1 to 20 hours to give an aqueous dispersion of a vinyl polymer (III).

The vinyl monomers which constitute the vinyl polymer (III) is a compound having at least one unsaturated bond which can be radically polymerized. Examples of the vinyl monomers include styrenic monomers such as styrene, α-methylstyrene, vinyltoluene, hydroxystyrene, 4-styrenesulfonic acid and its sodium or potassium salt etc.; (meth)acrylonitrile; vinyl esters such as vinyl acetate, vinyl pivalate, etc.; (meth)acrylates such as methyl (meth) acrylate, ethyl (meth)acrylate, butyl (meth)acrylate, dodecyl (meth)acrylate, 2-ethylhexyl (meth)acrylate, 2-hydroxyethyl (meth)acrylate, etc.; (meth)acrylamide; N-vinyl-2-pyrrolidone; dienes such as 1,3-butadiene, isoprene, chloroprene, 1,5-hexadiene, etc.; maleic acid; esters of maleic acid such as diethyl maleate, di-n-butyl maleate, etc., fumaric acid; esters of fumaric acid such as di-n-butyl fumalate, etc., vinyl chloride; and vinylidene chloride. One or more of these monomers may be used. Of those, preferred are styrenic monomers, vinyl esters and (meth)acrylates.

The radical polymerization of the vinyl monomers is performed in the presence of an ordinary radical polymerization initiator. Examples of radical polymerization initiator are azo compounds such as 2,2'-azobis(isobutyronitrile); peroxides such as cumene hydroperoxide, t-butyl hydroperoxide, hydrogen peroxide and antimony peroxide; persulfates such as potassium persulfate; and redox type initiators such as a combination of above discribed peroxide or persulfate and a reducing agent of sodium thiosulfate, iron (II) chloride and so on.

Emulsifiers can include, for example, anionic surfactants such as metal salts of an aliphatic carboxylic acid; nonionic surfactants such as polyoxyethylene alkyl ethers, polyoxyethylene alkylphenol ethers, polyoxyethylene alkyl esters and sorbitan alkyl esters.

The thus-obtained aqueous dispersion of the vinyl polymer (III) may be adjusted to an appropriate viscosity with aqueous ammonia, etc. And, if necessary, the aqueous dispersion of the vinyl polymer (III) may contain a filler, a crosslinking agent and/or the like. Those aqueous dispersions of the vinyl polymer (III) are also commercially available as aqueous emulsion type adhesive compositions such as acrylic aqueous emulsion adhesive compositions comprising a polymer mainly made of acrylic ester, vinyl acetate-based aqueous emulsion adhesive compositions comprising a polymer mainly made of vinyl acetate, and styrenic aqueous emulsion adhesive compositions comprising a polymer mainly made of styrene. Various kinds of aqueous emulsion type adhesive compositions can be used. Among them, the most suitable one may be selected according to each adherend material.

Where the vinyl polymer (III) is soluble in water, it may be used in the form of an aqueous solution. The water-soluble vinyl polymer can include, for example, polyvinyl alcohol and the like.

The weight ratio of the sum of the solid matter in the aqueous dispersion (I) to the vinyl polymer (III) is preferably within the range of 10:90 to 90:10 from the viewpoint of adhesiveness, water resistance of the coating layer obtained by the aqueous dispersion of the invention, etc. These ranges include 20, 30, 40, 50, 60, 70, and 80 as appropriate.

Furthermore, the aqueous dispersion of the invention can be produced by incorporating a tackifier (IV) into the aqueous dispersion (I) of the block copolymer (I).

The tackifier (IV) is in general use in such fields as pressure-sensitive adhesive tapes, coating compositions and hot melt adhesives. Tackifier (IV) includes, for example, petroleum resins such as C4, C5, C9 and C4–C9 copolymers, hydrogenated petroleum resins, rosin derivative (rosin, polymerized rosin, hydrogenated rosin, esters thereof with glycerol, pentaerythritol, etc., dimer of resin acid, etc.), terpene resins (terpene resins produced by polymerization of α,- and/or β-pinene, terpene-phenol resins, aromatic-modified terpene resins, hydrogenated terpene resins, etc.), cumarone-indene resins, phenol resins, xylene resins, styrenic resins and the like. Generally, the tackifier (IV) has a number-average molecular weight within the range of 500 to 3,000 and has a softening point within the range of 50 to 140° C. as determined by the ring and ball method. Hydrogenated petroleum resins, among others, are excellent in compatibility with block copolymer (I) and can provide the aqueous dispersion of the invention with good stability and good adhesiveness, especially airtight adhesiveness, to various substrates.

Hydrogenated petroleum resin can include, for example, commercially available ones such as "Regalrez" (trade name; product by Rika-Hercules Inc.), "Regalite" (trade name; product by Rika-Hercules Inc.), "Arkon" (trade name; product by Arakawa Chemical Industries Co., LTD.), "Escorez Resins" (trade name; product by Tonex Inc.), "Quintone" (trade name; product by Zeon Corporation), "I-marv" (trade name; product by Idemitsu Petrochemical Co. Ltd.).

The weight ratio of the sum of the solid matter in the aqueous dispersion (I) to tackifier (IV) is preferably within the range of 99.9:0.1 to 50:50, more preferably 99:1 to 70:30. These ranges include 99.8, 99.7, 99.5, 99.0, 95, 90, 80, 60, 50, 40, 20, 10, 5, 1 and 0.5 as appropriate.

The method of incorporation of tackifier (IV) into the aqueous dispersion (I) of the block copolymer (I) is not particularly restricted. For example, tackifier (IV) may be dispersed in water using an emulsifier or the like, and then admixed with the aqueous dispersion (I). Also, both of block copolymer (I) and tackifier (IV) may be simultaneously dispersed in water to give the aqueous dispersion of the invention. The latter method is preferred in view of the stability of the resulting aqueous dispersion, that is the aqueous dispersion of the invention, and the water resistance of the coating layers obtained therefrom.

Tackifier (IV) may also be incorporated into an aqueous dispersion comprising the aqueous dispersion (I) and polyurethane (II). In this case, the weight ratio of the solid matter in the aqueous dispersion (I) to the tackifier (IV) is 99.9:0.1 to 50:50. And the weight ratio of polyurethane (II) to the total weight of tackifier (IV) and the sum of the solid matter in the aqueous dispersion (I) is preferably within the range of 5:95 to 95:5 in view of the stability of the resulting aqueous dispersion, that is the aqueous dispersion of the invention, and the adhesiveness and water resistance of the coating layers obtained therefrom. The manner of incorporation of tackifier (IV) and polyurethane (II) to the aqueous dispersion (I) is not particularly restricted; either of tackifier (IV) or polyurethane (II) may be added first, or both may be added simultaneously to the aqueous dispersion (I). Also, the block copolymer (I), polyurethane (II) and tackifier (IV) may be dispersed in an aqueous medium all at once.

Where necessary, the tackifier (IV) may be incorporated into an aqueous dispersion comprising the aqueous dispersion (I) and an aqueous dispersion or an aqueous solution of a vinyl polymer (III). In this case, the weight ratio of the solid matter in the aqueous dispersion (I) to the tackifier (IV) is 99.9:0.1 to 50:50. And the weight ratio of vinyl polymer (III) to the total weight of tackifier (IV) and the sum of the solid matter in the aqueous dispersion (I) is preferably 5:95 to 95:5 from the viewpoint of the adhesiveness and water resistance of the coating layers obtained from the resulting aqueous dispersion, that is the aqueous dispersion of the invention.

The manner of incorporation of tackifier (IV) and the aqueous dispersion or aqueous solution of vinyl polymer (III) is not particularly restricted; either of tackifier (IV) or the aqueous dispersion or aqueous solution of vinyl polymer (III) may be added first, or both may be added simultaneously to the aqueous dispersion (I).

The aqueous dispersion of the invention may further contain a curing agent (V) together with the above-mentioned block copolymer (I), polyurethane (II), vinyl polymer (III) and tackifier (IV). Incorporation of a curing agent can improve the water resistance and resistance to solvent attack of the coating layers obtained from the resulting aqueous dispersion, that is the aqueous dispersion of the invention.

The curing agent (V) is a water-soluble or water-dispersible compound having at least two functional groups capable of reacting with the carboxyl group or acid anhydride group in block copolymer (I). The functional groups can include epoxy group, aziridine group, oxazoline group, carbodiimide group, isocyanato group and so on.

Preferred curing agents (V) are epoxy compounds. A condensation products having epoxy groups obtained by reacting epichlorohydrin with a bisphenol or a polyhydric alcohol are more preferred. The epoxy compounds preferably have an epoxy equivalent, that is the weight per 1 mol of epoxy group, within the range of 50 to 2,500, more preferably within the range of 100 to 1,000. The epoxy compounds preferably have a number-average molecular weight within the range of 150 to 5,000, more preferably within the range of 200 to 3,000.

Epoxy compounds can includes, for example, sorbitol polyglycidyl ether, sorbitan polyglycidyl ether, polyglycerol polyglycidyl ether, pentaerythrytol polyglycidyl ether, diglycerol polyglycidyl ether, triglycidyl tris(2-hydroxyethyl) isocyanurate, glycerol polyglycidyl ether, trimethylolpropane polyglycidyl ether, resorcinol diglycidyl ether, neopenty glycol diglycidyl ether, 1,6-hexanediol diglycidyl ether, poly(ethylene glycol) diglycidyl ether, poly(propylene glycol) diglycidyl ether, poly(tetramethylene glycol) diglycidyl ether, allyl glygidyl ether, 2-ethylhexyl glycidyl ether, phenyl glycidyl ether, phenol ethylene oxide glycidyl ether, p-t-butylphenyl glycidyl ether, lauryl alcohol ethylene oxide diglycidyl ether, diglycidyl adipate, diglycidyl o-phthalate, hydroquinone diglycidyl ether, bisphenol A digkycidyl ether, bisphenol S digkycidyl ether, diglycidyl terephthalate, glycidyl phthalimide, dibromophenyl glycidyl ether, dibromoneopentyl glycol diglycidyl ether.

In particular, ethylene glycol diglycidyl ether, polyethylene glycol diglycidyl ether and bisphenol A diglycidyl ether are preferred since they can give aqueous dispersions of the invention excellent in adhesiveness to various substrates and facilitate the preparation of the aqueous dispersions.

These epoxy compounds are used as a form of aqueous dispersion thereof or a aqueous solution thereof. Aqueous dispersion of epoxy compounds can include, for example, commercially available ones such as "Denacol" (trade name; product by Nagase Chemical Co., Ltd.), "Denacast" (trade name; product by Nagase Chemical Co., Ltd.), and "Epolsion" (trade name; product by Nippon NSC Co., Ltd.). Aqueous solution of an epoxy compound can be easily prepared from water soluble epoxy compound.

Curring agent (V), other than epoxy compounds, can include, for example, aziridines such as "PZ-33" (trade name; product by Nippon Shokubai Co., Ltd.); oxazolines such as "WS-500" (trade name; product by Nippon Shokubai Co., Ltd.) and "K-2030E" (trade name; product by Nippon Shokubai Co., LTD.); carbodiimides such as "Carbodilite E-01 " (trade name; product by Nisshinbo Industries, Inc.) and "Carbodilite V-02" (trade name; product by Nisshinbo Industries, Inc.); isocyanates such as "CR-6N" (trade name; product by Dainippon Ink & Chemicals, Inc.) and "Takerak WD" (trade name; product by Takeda Chemical Industries, Co., Ltd.).

The amount of curing agent (V) is preferably within the range of 0.2 to 20% by weight relative to the total amount of the solid matter such as the block copolymer (I), polyurethane (II), vinyl polymer (III), tackifier (IV), olefin polymer, when present, and so forth in the aqueous dispersion of the invention. When the amount of a curing agent (V) is lower than 0.2% by weight relative to the total amount of the solid matter in the aqueous dispersion of the invention, the resistance to solvent attack and water resistance of the coating layers obtained from the aqueous dispersion of the invention may be decreased. On the other hand, when the amount of the curing agent (V) is higher than 20% by weight, the adhesiveness of the aqueous dispersion of the invention to polyolefin materials may become decreased. These ranges include 0.3, 0.5, 0.7, 1.1, 2, 5, 7, 10, 12, 14 and 18%.

The manner of addition of the curing agent (V) is not particularly restricted. It may be added after other components described above or simultaneously with some of the other components.

If desired, the aqueous dispersion of the invention may contain a thickening agent, an anti-foaming agent, etc. A thickening agent includes water-soluble polymers such as carboxymethyl cellulose, methyl cellulose, sodium polyphosphate, polyvinylalcohol, sodium polyacrylate, casein, copolymer of vinylalcohol and methacrylic acid, starch and protein.

For improving the wettability of the substrates to which the aqueous dispersion of the present invention is applied, a small amount of an organic solvent may be added to the aqueous dispersion of the invention. In addition, the aqueous dispersion of the invention may further contain various stabilizers such as antioxidant, weather-proofing stabilizer, thermal degradation inhibitor, uv stabilizer, etc.; colorants such as titanium oxide, organic pigment, etc.; electroconductive agents such as carbon black, ferrite, etc.; organic fillers and inorganic fillers.

Antioxidant includes 2,6-di-t-butyl-p-cresol, o-t-butyl-p-cresol, tetrakis-(methylene-3-(3,5-di-t-butyl-4-hydroxyphenyl)propionate)methane, β-naphtylamine, p-phenylenediamine, etc.

UV stabilizer includes 2,4-dihydroxybenzophenone, 2-(2'-dihydroxy-3',5'-di-t-butylphenyl)-5-chlorobenzotriazole, 2-(2-hydroxy-3-t-butyl-5-methylphenyl)-5-chlorobenzotriazole, bis(2,2',6,6'-tetramethyl-4-piperidino) sebacate, etc.

Organic fillers include, for example, wood powder, pulp powder and polymer particles of rayon, vinylon, polyamide, polyamidimide, polyimide, polytetrafluoroethylene. Inorganic fillers include, for example, particles of silicates such as talc, clay, kaolin and mica; particle of oxides such as silica, titanium oxide, iron oxide and zinc oxide; particle of hydroxides such as aluminum hydroxide and magnesium hydroxide; particles of carbonates such as calcium carbonate and magnesium carbonate; particle of sulfates such as barium sulfate and calcium sulfate.

These additional components can be incorporated into the aqueous dispersion of the invention by a conventional manner.

Preferably, the mean particle size of the matters dispersed in the aqueous dispersion of the invention falls between 0.05 and 2 μm, more preferably between 0.05 and 1 μm, in view of the stability of the aqueous dispersion and of the adhesiveness, especially airtight adhesiveness, thereof to various substrates. These ranges include 0.075, 0.1, 1.1, 1.5 and 1.7 μm. Since the particle size of the matters dispersed therein is small, the aqueous dispersion of the invention has good stability, and hardly undergoes phase separation.

The adhesiveness, especially, the airtight adhesiveness, of the aqueous dispersion of the invention to polyolefin resins, especially to polypropylene is good, and the adhesiveness thereof even to polar substrates is also good. Accordingly, the aqueous dispersion of the invention is useful for paint compositions, adhesives, surface treating agents and primers for paint coating and adhesives.

The aqueous dispersion of the invention allows good dispersion of various pigments therein and gives coating layers excellent in gloss, water resistance, wear resistance, resistance to light and solvent attack. Therefore, the aqueous dispersion of the invention is useful as a base material in the preparation of coating compositions such as paints, adhesives and primers.

The aqueous dispersion of the invention can appropriately be used as a coating composition to be applied to moldings or shaped articles made of polyolefins such as high pressure polyethylene, medium/low pressure polyethylene, polypropylene, poly-4-methylpentene and polystyrene or polyolefin copolymers such as ethylene-propylene copolymers, ethylene-butene copolymers, propylene-butene copolymers and ethylene-propylene diene terpolymers.

Further, the aqueous dispersion of the invention can be applied not only to the above-mentioned polyolefins and other polymers but also to moldings made of polypropylene and a synthetic rubber, moldings made of polyamide, unsaturated polyester, polybutylene terephthalate, polycarbonate or the like, steel sheets or plates, electrodeposition-treated steel sheets or plates and so forth.

It can further be applied, as a primer, to the surface of the various materials described above to which a paint, an adhesive or like composition comprising, as a main component, a polyurethane, polyester modified with a fatty acid, oil-free polyester, melamine resin, epoxy resin or like resin, is applied, in order to improve the adhesion of such paint, adhesive or like composition to the surface and to form coatings of such paint, adhesive or like composition having excellent properties of, for example, image sharpness and impact resistance at low temperature. Thus, the aqueous dispersion of the invention is suited for use as a primer for improving the adhesion of a paint, an adhesive or like composition to the surface of automotive bumpers and other moldings made of polyolefins such as polypropylene, automotive bumpers and other moldings made of polypropylene and a synthetic rubber, SMC (sheet molding compound) moldings produced by using an unsaturated polyester, epoxy resin or like resin, glass fiber-reinforced polyamide moldings, polyurethane moldings, cationic electrodeposition-coated steel plates or sheets and so forth.

The moldings or shaped articles, to which the aqueous dispersion of the invention is applied, may be made of the above-mentioned various polymers or resins by any of those moldings methods known in the art, such as injection molding, compression molding, blow molding, extrusion molding, rotational molding, etc.

In applying the aqueous dispersion of the invention to the surface of moldings, it is not necessary to perform that pretreatment or vapor degreasing using a chlorine-containing solvent such as 1,1,1-trichloroethane or 1,1,2-trichloroethylene, which is ordinary in the art. Prior to the application of the coating compositions comprising the aqueous dispersion of the invention, the surface of moldings is preferably washed or cleansed with an alcohol such as ethanol or isopropyl alcohol or with a weakly acidic or weakly alkaline aqueous solution.

Suitable method of applying the aqueous dispersion of the invention to the surface of moldings is the technique of application by spraying. Thus, for example, the surface is sprayed with the dispersion by means of a spray gun. The application to the surface of moldings may be conducted at ordinary temperature and, after application, the coating layer of the aqueous dispersion of the invention is dried by an appropriate method, for example in the manner of natural or air drying or drying by heating.

After application of the aqueous dispersion of the invention to the surface of moldings and drying of the same as mentioned above, a paint, an adhesive or like composition can then be applied over the coating layer of the aqueous dispersion of the invention by electrostatic coating, spray coating, or brushing, for instance. The paint, adhesive or like composition may be applied in several times. While the paint, adhesive or like composition is not particularly restricted, the aqueous dispersion of the invention is particularly preferred as a primer for solvent-thinned thermoplastic acrylic resin coating compositions, solvent-thinned thermosetting acrylic resin coating compositions, acrylic-modified alkyd resin coating compositions, epoxy resin coating compositions, polyurethane resin coating compositions, melamine resin coating compositions and the like, since the aqueous dispersion of the invention can form a coating layer having high adhesiveness to the above coating compositions. After application of the paint, adhesive or like compositions, the layers of the paint, adhesive or like compositions may be cured in the conventional manner by heating using a nichrome wire heater, infrared heater, high-frequency microwave heater or the like, to give moldings having a desired layer of the paint, adhesive or like composition on the surface thereof. The method of curing the layer of paint, adhesive or like composition can appropriately be selected according to the material and shape of moldings, the properties of the paint, adhesive or like composition to be used and other factors.

In addition, the aqueous dispersion of the invention is useful for coating agents, such as water-proofing agents, lubricants, heat-sealing agents and adhesives between different materials, applicable for an article of various shapes including molded article, films, sheets, which is made of paper, wood, metals, plastics, etc. The aqueous dispersion of the invention is also useful for aqueous paint coating; aqueous ink modifiers for the improvement of pigment dispersion, surface gloss, abrasion resistance, water-proofness, etc.; binders for ink-jet ink, color copies, etc.; toner modifiers; finishing agents; surface-treating agents for metals, etc.

EXAMPLES

Now, the invention is described in more detail hereinbelow with reference to the following Examples and Comparative Examples, which are provided for the purposes of illustration only, however, and are not intended to restrict the scope of the invention.

In the following examples, measurement of mean particle size, paint coating test and heat lamination test are performed as shown below.

Measurement of Mean Particle Size

Using "ELS800" (trade name; product by Otsuka Electronics Inc.), each sample is analyzed according to a light-scattering method.

Paint Coating Test

1. Cross Cut Cape Test

A test piece having 100 cross checks was prepared according to the method of cross cut tape test of JIS K5400. A cellophane tape (product by Nichiban Inc.) was attached on the cross checks, then the tape was removed quickly and the number of the cross checks left was reported.

2. Evaluation of Water Resistance

A test piece was immersed in the water of temperature of 40° C. for 240 hours, wiped to remove water and stood still under room temperature for 1 hour. The resulting test piece was subjected to cross cut tape test.

3. Evaluation of Resistance to Light

A test piece was exposed to light for 400 hours using fade meter (black panel temperature of 83° C.). The resulting test piece was subjected to cross cut tape test.

Heat Lamination Test

The aqueous dispersion to be evaluated was applied to the untreated surface of an OPP film using a #32 bar coater and, after drying at 50° C., the resulting film was subjected, together with the films specified below, to lamination using a test laminating machine. The laminated films obtained were tested for T-shape peel strength at a peeling speed of 50 mm/min according to JIS K 6854-3. When no adhesion occurred, the peel strength was expressed as "0 (zero)". When the film was broken without peeling, the result was reported as "Broken".

(Films as Adherent)
  OPP film [thickness of 20 $\mu$m; "Tohcello OP-U1" (trade name; product by Tohcello Co., Ltd.)]
  PET film [thickness of 100 $\mu$m; "Diafoil S" (trade name; product by Diafoil Co. Ltd.)]
  PA 6 film [thickness of 40 $\mu$m; "Rayfan" (trade name; product by Toray Industries, Inc.)]
  ethylene-vinylalcohol copolymer film [thickness of 15 $\mu$m; "Eval F" (trade name; product by Kuraray Co., Ltd.]

<Production Example 1>

Production of Aqueous Dispersion (I-1) of Block Copolymer (I-1) (Propylene-α-Olefin Block/Ethyl Acrylate-Acrylic Acid Block Copolymer):

(1) 500 g of a propylene-α-olefin copolymer ["Tafmer XR110T" (trade name; product by Mitsui Chemicals, Inc.)] was heated up to 390° C. and stirred for 2 hours, in a one-liter reactor, to give a propylene-α-olefin copolymer having a carbon—carbon double bond at the terminal. The terminal carbon—carbon double bond content of the copolymer was 188.7 $\mu$mols/g.

(2) A reactor was charged with 100 parts by weight of the propylene-α-olefin copolymer having a carbon—carbon double bond at the terminal, obtained in the above (1), 300 parts by weight of xylene and 4.3 parts by weight of thio-S-acetic acid, followed by the replacement of the atmosphere in the reactor with nitrogen, and 0.1 parts by weight of 2,2'azobisisobutyronitrile was added to the mixture. The obtained mixture was reacted at 90° C. for 2 hours to give a propylene-α-olefin copolymer having a thioacetyl group at the terminal. The terminal thioacetyl content of the copolymer was 179.2 $\mu$mols/g, and the degree of addition reaction was 95%.

(3) 5.7 parts by weight of 4% solution of sodium hydroxide in n-butanol was added to the solution of 100 parts by weight of the propylene-α-olefin copolymer having a thioacetyl group at the terminal, obtained in the above (2), in a mixed solvent of 120 parts by weight of xylene and 30 parts by weight of n-butanol. In nitrogen, the obtained mixture was reacted for 1 hour at the reflux point of toluene to give a propylene-α-olefin copolymer having a mercapto group at the terminal. The terminal mercapto content of the copolymer was 175.6 μmols/g, and the degree of reaction was 98%.

(4) 80 parts by weight of ethyl acrylate and 10 parts by weight of acrylic acid were added to the solution of 100 parts by weight of the propylene-α-olefin copolymer having a mercapto group at the terminal, obtained in the above (3), in 150 parts by weight of xylene. 1,1'-Azobis(cyclohexane-1-carbonitrile) was added to the mixture to such an extent that the polymerization rate of the monomers could be about 10%/hr in nitrogen at 90° C., and the monomers were polymerized in that condition. When the degree of polymerization reached 95%, the reaction was stopped. After the reaction mixture was cooled, the solvent was removed from the reaction mixture to give an AB-type diblock copolymer composed of propylene-α-olefin block (A) and ethyl acrylate-acrylic acid block (B) (ethyl acrylate/acrylic acid= 90/10 by weight). This is hereinafter referred to as block copolymer (I-1). The block copolymer (I-1) has the polymer block (A) of the number-average molecular weight of 5,300 and the polymer block (B) of the number-average molecular weight of 4,500. The number-average molecular weight of the block copolymer (I-1) was 9,800; and the melting point thereof was 103° C.

(5) A 0.5-liter reactor equipped with a stirrer and a condenser was charged with 50 g of the block copolymer (I-1) obtained above and 250 g of xylene, and the block copolymer (I-1) was dissolved at 100° C. Next, 300 g of 0.1% aqueous sodium hydroxide was fed into the solution with a dropping funnel over 1 hour to give a xylene-water suspension. Xylene was evaporated from the suspension to give a crude emulsion. An autoclave was charged with 300 g of the crude emulsion (having a solid matter content of 50 g) and 3.9 g of 28% aqueous ammonia, and the mixture was stirred at 160° C. for 1 hour. Cooling of the reaction mixture to room temperature gave an aqueous dispersion (I-1). The particles dispersed in the aqueous dispersion (I-1) were spherical, and their mean particle size was 0.3 μm. After stood still for 1 week, the aqueous dispersion (I-1) was stable with no change of particle size.

<Production Example 2>

Production of Aqueous Dispersion (I-2) of Block Copolymer (I-2) (Polypropylene Block/Ethyl Acrylate-Acrylic Acid Block Copolymer):

(1) 500 g of polypropylene ["Mitsubishi Noblen MH8" (trade name; product by Mitsubishi Chemical Corporation)] was heated up to 390° C. and stirred for 4 hours, in a one-liter reactor, to give a polypropylene having a carbon—carbon double bond at the terminal. The terminal carbon—carbon double bond content of the polypropylene was 232.5 μmols/g.

(2) A reactor was charged with 100 parts by weight of the polypropylene having a carbon—carbon double bond at the terminal, obtained in the above (1), 300 parts by weight of xylene and 5.3 parts by weight of thio-S-acetic acid, followed by the replacement of the atmosphere in the reactor with nitrogen, and 0.2 parts by weight of 2,2'-azobisisobutyronitrile was added to the mixture. The obtained mixture was reacted at 90° C. for 2 hours to give polypropylene having a thioacetyl group at the terminal. The terminal thioacetyl content of the copolymer was 218.6 μmols/g, and the degree of addition reaction was 94%.

(3) 6.9 part by weight of 4% solution of potassium hydroxide in n-butanol was added to the solution of 100 parts by weight of the polypropylene having a thioacetyl group at the terminal, obtained in the above (2), in a mixed solvent of 120 parts by weight of xylene and 30 parts by weight of n-butanol. In nitrogen, the obtained mixture was reacted for 1 hour at the reflux point of toluene to give polypropylene having a mercapto group at the terminal. The terminal mercapto content of the copolymer was 214.2 μmols/g, and the degree of reaction was 98%.

(4) 80 parts by weight of ethyl acrylate and 10 parts by weight of acrylic acid were added to the solution of 100 parts by weight of the polypropylene having a mercapto group at the terminal, obtained in the above (3), in 150 parts by weight of xylene. 1,1'-Azobis(cyclohexane-1-carbonitrile) was added to the mixture to such an extent that the polymerization rate of the monomers could be about 10%/hr in nitrogen at 90° C., and the monomers were polymerized in that condition. When the degree of polymerization reached 90%, the reaction was stopped. After the reaction mixture was cooled, the solvent was removed from the reaction mixture to give an AB-type diblock copolymer composed of polypropylene block (A) and ethyl acrylate-acrylic acid block (B) (ethyl acrylate/acrylic acid=90/10 by weight). This is hereinafter referred to as block copolymer (I-2). The block copolymer (I-2) has the polymer block (A) of the number-average molecular weight of 4,300 and the polymer block (B) of the number-average molecular weight of 3,800. The number-average molecular weight of the block copolymer (I-2) was 8,100; and the melting point thereof was 148° C.

(5) A 0.5-liter reactor equipped with a stirrer and a condenser was charged with 50 g of the block copolymer (I-2) and 250 g of xylene, and the block copolymer (II) was dissolved at 100° C. Next, 300 g of 0.1% aqueous sodium hydroxide was fed into the solution with a dropping funnel over 1 hour to give a xylene-water suspension. Xylene was evaporated from the suspension to give a crude emulsion. An autoclave was charged with 300 g of the crude emulsion (having a solid matter content of 50 g) and 3.9 g of 28% aqueous ammonia, and the mixture was stirred at 160° C. for 1 hour. Cooling of the reaction mixture to room temperature gave an aqueous dispersion (I-2). The particles dispersed in the aqueous dispersion (I-2) were spherical, and their mean particle size was 0.3 μm. After stood still for 1 week, the aqueous dispersion (I-2) was stable with no change of particle size.

<Production Example 3>

Production of Aqueous Dispersion (I-3) of Block Copolymer (I-3) (Propylene-α-Olefin Block/Ethyl Acrylate-Maleic Anhydride Block Copolymer):

(1) 80 parts by weight of ethyl acrylate and 10 parts by weight of maleic anhydride were added to the solution of 100 parts by weight of the propylene-α-olefin copolymer having a mercapto group at the terminal, obtained in (3) in Production Example 1, in 150 parts by weight of xylene. 1,1'-Azobis(cyclohexane-1-carbonitrile) was added to the mixture to such an extent that the polymerization rate of the monomers could be about 10%/hr in nitrogen at 90° C., and the monomers were polymerized in that condition. When the degree of polymerization reached 95%, the reaction was stopped. After the reaction mixture was cooled, the solvent was removed from the reaction mixture to give an AB-type diblock copolymer composed of propylene-α-olefin block (A) and ethyl acrylate-maleic anhydride block (B)(ethyl acrylate/maleic anhydride=90/10 by weight). This is hereinafter referred to as block copolymer (I-3). The block copolymer (I-3) has the polymer block (A) of the number-average molecular weight of 5,300 and the polymer block (B) of the number-average molecular-weight of 3,000. The number-average molecular weight of the block copolymer (I-3) was 8,300; and the melting point thereof was 103° C.

(2) A 0.5-liter reactor equipped with a stirrer and a condenser was charged with 50 g of the block copolymer (I-3) and 250 g of xylene, and the block copolymer (I-3) was dissolved at 100° C. Next, 300 g of 0.1% aqueous sodium hydroxide was fed into the solution with a dropping funnel over 1 hour to give a xylene-water suspension. Xylene was evaporated from the suspension to give a crude emulsion. An autoclave was charged with 300 g of the crude emulsion (having a solid matter content of 50 g) and 3.9 g of 28% aqueous ammonia, and the mixture was stirred at 160° C. for 1 hour. Cooling of the reaction mixture to room temperature gave an aqueous dispersion (I-3). The particles dispersed in the aqueous dispersion (I-3) were spherical, and their mean particle size was 0.2 μm. After stood still for 1 week, the aqueous dispersion (I-3) was stable with no change of particle size.

<Production Example 4>

Production of Aqueous Dispersion (I-4) of Block Copolymer (I-1) (Propylene-α-Olefin Block/Ethyl Acrylate-Acrylic Acid Block Copolymer) and Propylene-α-Olefin Copolymer:

A 0.5-liter reactor equipped with a stirrer and a condenser was charged with 40 g of the block copolymer (I-1) obtained in (4) in Production Example 1, 10 g of propylene-α-olefin copolymer ["Tafmer XR110T" (trade name; product by Mitsui Chemicals, Inc.)] and 250 g of xylene, and the polymers were dissolved at 100° C. Next, 300 g of 0.18% aqueous sodium hydroxide was fed into the solution with a dropping funnel over 1 hour to give a xylene-water suspension. Xylene was evaporated from the suspension to give a crude emulsion. An autoclave was charged with 300 g of the crude emulsion (having a solid matter content of 50 g) and 3.4 g of 28% aqueous ammonia, and the mixture was stirred at 160° C. for 1 hour. Cooling of the reaction mixture to room temperature gave an aqueous dispersion (I-4). The particles dispersed in the aqueous dispersion (I-4) were spherical, and their mean particle size was 0.4 μm. After stood still for 1 week, the aqueous dispersion (I-4) was stable with no change of particle size.

<Production Example 5>

Production of Aqueous Dispersion (II-1) of Polyurethane (II-1):

A three-necked flask equipped with a condenser was charged with 77.0 g of isophoronediisocyanate, 180.0 g of poly(3-methyl-1,5-pentylene/hexamethylene carbonate) diol with a number-average molecular weight of 2,000 (produced by reacting a 1:1 (by weight) mixture of 3-methyl-1,5-pentanediol and 1,6-hexanediol with diethyl carbonate), 15.3 g of 2,2-bis(hydroxymethyl)butyric acid and 153.2 g of 2-butanone, and the mixture was stirred at 70° C. for 4 hours in a dry nitrogen atmosphere to give a solution of polyurethane prepolymer in 2-butanone. Then, after cooling to 40° C., an aqueous solution of 10.5 g of triethylamine in 250.6 g of distilled water was added to the solution of polyurethane prepolymer over 1 minute and the resulting mixture was further stirred for 3 minutes to effect emulsification. Then, 259.9 g of distilled water was added to the resulting emulsion and, after 3 minutes of stirring, an aqueous solution of 21.2 g of piperazine hexahydrate and 2.5 g of diethylenetriamine in 67.2 g of distilled water was added over 1 minute, and the resulting mixture was further stirred for 3 hours to effect the chain extension reaction. The 2-butanone was removed from the reaction mixture using a rotary evaporator to give an aqueous dispersion (II-1) of polyurethane (II-1) with a solid matter content of 33% by weight. The dispersed substance in the aqueous dispersion (II-1) had a mean particle size of 0.2 μm. After stood still for 1 week, the aqueous dispersion (II-1) was stable and showed no change in mean particle size.

<Production Example 6>

Production of Aqueous Dispersion (II-2) of Polyurethane (II-2) Which Contains 39 Weight % Of Aliphatic Hydrocarbon Unit of 250 Carbon Atoms:

A three-necked flask equipped with a condenser was charged with 57.3 of 2,4-tolylene diisocyanate, 140.0 g of polytetramethylene glycol with a number average molecular weight of 2,000, 140.0 g of hydrogenated polybutadienediol, the number average molecular weight of which was 3,500 ["GI-3000" (trade name; product by Nippon Soda Co., Ltd.)], 9.1 g of 2,2-bis(hydroxymethyl)butyric acid and 183.5 g of toluene, and the mixture was stirred at 80° C. for 4 hours in a dry nitrogen atmosphere to give a solution of polyurethane prepolymer in toluene. Then, after cooling to 40° C., 6.2 g of triethylamine was added to the solution of polyurethane prepolymer and the resulting mixture was stirred for 10 minutes. Then, an aqueous solution of 7.4 g of sodium lauryl sulfate in 267.0 g of distilled water was added to the mixture and the obtained mixture was stirred for 1 minute using a homogenizing mixer to effect emulsification and, immediately thereafter, an aqueous solution of 7.1 g of diethylenetriamine and 5.9 g of isophoronediamine in 467.1 g of distilled water was added, followed by 1 minute of stirring using a homogenizing mixer, to effect the chain extension reaction. The toluene was removed from the reaction mixture using a rotary evaporator to give an aqueous dispersion (II-2) of polyurethane (II-2) with a solid matter content of 33% by weight. The dispersed substance in the aqueous dispersion (II-2) had a mean particle size of 0.5 μm. After stood still for 1 week, the aqueous dispersion (II-2) was stable and showed no change in mean particle size.

<Production Example 7>

Production of Aqueous Dispersion (II-3) of Polyurethane (II-3) Which Contains 32 Weight % of Aliphatic Hydrocarbon Unit of 780 Carbon Atoms:

(1) Using the propylene-α-olefin copolymer having carbon—carbon double bond at the terminal obtained in the same manner as in Production Example 1 (1), propylene-α-olefin copolymer having a hydroxyl group at the terminal was produced in the same manner as in Production Example 1 (2) except that 2-mercaptoethanol was used instead of thio-S-acetic acid. The terminal hydroxyl group content was 181.2 μmol/g and the conversion in the addition reaction was 96%.

(2) A three-necked flask equipped with a condenser was charged with 81.8 g of isophoronediisocyanate, 100.0 g of poly(3-methyl-1,5-pentylene adipate) diol with a number-average molecular weight of 2,000, 100.0 g of the propylene-α-olefin copolymer having a hydroxyl group at the terminal obtained as described above (1), 15.5 g of 2,2-bis(hydroxymethyl)propionic acid and 154.2 g of toluene, and the mixture was stirred at 80° C. for 4 hours in a dry nitrogen atmosphere to give a solution of polyurethane prepolymer in toluene. Then, after cooling to 40° C., 11.7 g of triethylamine was added to the solution of polyureythane prepolymer and the resulting mixture was stirred for 15 minutes. 278.1 g of distilled water was added to the mixture over 1 minute, and the mixture was further stirred for 3 minutes to effect emulsification. Then, 215.0 g of distilled water was added to the emulsion and, after 3 minutes of stirring, an aqueous solution of 9.5 g of diethylenetriamine and 2.8 g of ethylenediamine in 123.6 g of distilled water was added over 1 minute, and the mixture was further stirred for 3 hours to effect the chain extension reaction. The toluene was removed from the reaction mixture using a rotary evaporator to give an aqueous dispersion (II-3) of a polyurethane (II-3) with a solid matter content of 33% by weight. The dispersed substance in the aqueous dispersion (II-3) had a mean particle size of 0.7 μm. After stood still for 1 week, the aqueous dispersion (II-3) was stable and showed no change in mean particle size.

<Production Example 8>

Production of Aqueous Dispersion (II-4) of Composite Polyurethane (II-4) [Containing 70% by Weight of a Polymer Derived From a Vinyl Monomer]

(1) A three-necked flask equipped with a condenser was charged with 53.8 g of isophoronediisocyanate, 40.0 g of poly(tetramethylene glycol) with a number-average molecular weight of 850, 12.0 g of 2,2-bis(hydroxymethyl)butyric acid, 2.0 g of 2-hydroxyethyl methacrylate and 32.3 g of ethyl acrylate, and the mixture was stirred at 70° C. for 4 hours in a dry nitrogen atmosphere. Then, 42.0 g of ethyl acrylate and 1.5 g of 1,6-hexanediol diacrylate were added to the reaction mixture to give a solution of polyurethane prepolymer in ethyl acrylate. Then, after cooling to 40° C., an aqueous solution of 9.0 g of diethylaminoethanol in 116.8 g of distilled water was added to the solution of polyurethane prepolymer over 1 minute and the resulting mixture was further stirred for 3 minutes to effect emulsification. Then, 215.9 g of distilled water was added to the emulsion and, after 3 minutes of stirring, an aqueous solution of 9.8 g of piperazine hexahydrate and 2.5 g of hydrazine monohydrate in 46.7 g of distilled water was added to the mixture over 1 minute, and the resulting mixture was further stirred to effect the chain extension reaction.

(2) An aqueous solution of 0.0097 g of ferrous sulfate heptahydrate, 0.29 g of potassium pyrophosphate, 0.45 g of Rongalite (sodium formaldehyde sulfoxylate dihydrate) and 0.019 g of ethylenediaminetetraacetic acid disodium salt in 174.0 g of distilled water was added to the aqueous dispersion containing polyurethane and ethyl acrylate obtained as described above (1). The temperature of the mixture was then raised to 40° C. and the atmosphere of the reaction system was thoroughly replaced with nitrogen. Then, an emulsion (containing polymerization initiator) composed of 0.088 g of cumene hydroperoxide, 0.044 g of an anionic emulsifier ["ECT-3NEX" (trade name; product by Nippon Surfactant Industries Co., Ltd.)] and 6.0 g of distilled water was added to the above mixture over 1 hour and, thereafter, a mixture of 190.1 g of ethyl acrylate and 3.9 g of 1,6-hexanediol diacrylate (vinyl monomers) and an emulsion (containing polymerization initiator) composed of 0.20 g of cumene hydroperoxide, 0.10 g of an anionic emulsifier ["ECT-3NEX" (trade name; product by Nippon Surfactant Industries Co., Ltd.)] and 14.0 g of distilled water were added dropwise to the resulting mixture, respectively, with dropping funnels over 2 hours. After the completion of the addition, the obtained mixture was maintained at 50° C. for 1 hour to make the polymerization to completion. Thus, an aqueous dispersion (II-4) of a composite polyurethane (II-4) with a solid matter content of 40% by weight. The dispersed substance in the aqueous dispersion (II-4) had a mean particle size of 0.2 μm. After stood still for 1 week, the aqueous dispersion (II-4) was stable and showed no change in mean particle size.

Example 1

An aqueous dispersion was prepared by incorporating, into 100 parts by weight (on the solid matter basis) of the aqueous dispersion (I-1), 60 parts by weight (on the solid matter basis) of the aqueous dispersion (II-1) and, further, an amount of 5% by weight (on the solid matter basis), relative to the sum of the solid matter in the aqueous dispersion (I-1) and the solid matter in the aqueous dispersion (II-1), of sorbitol polyglycidyl ether ["Denacol 611" (trade name; product by Nagase Chemical Co., Ltd.), which is an epoxy compound. The obtained aqueous dispersion was applied, by spraying, to a molded polypropylene sheet washed with hot water at 70° C., followed by 30 minutes of drying at 50° C., to give a film of thickness of 10 μm, and further followed by 15 minutes of annealing at the temperature specified in Table 1. On the above coating film, paint composition prepared from 10 parts by weight of a urethane based paint of two liquid type ["Retan PG" (trade name; product by Kansai Paint Co., Ltd.)] and 1 part by weight of a curing agent for "Retan" was applied, followed by 1 hour of drying at 50° C., to give a film of paint composition of thickness of 50 μm, and further followed by annealing at 100° C. The results of paint coating test are shown in Table 1. Also, the results of the heat lamination test are shown in Table 2.

Examples 2 to 4

Procedures of Example 1 were repeated except that the aqueous dispersions (II-2) to (II-4) were used instead of the aqueous dispersion (II-1). Obtained aqueous dispersions were subjected to paint coating test. Results are shown in Table 1. Also, some of the results of heat lamination test are shown in Table 2.

Examples 5 to 7

Procedures of Example 1 were repeated except that the aqueous dispersions (I-2) to (I-4) were used instead of the aqueous dispersion (I-1). Obtained aqueous dispersions were subjected to paint coating test. Results are shown in Table 1. Also, some of the results of heat lamination test are shown in Table 2.

Example 8

An aqueous dispersion was prepared by incorporating 60 parts by weight (on the solid matter basis) of the aqueous dispersion (II-1) into 100 parts by weight (on the solid matter basis) of the aqueous dispersion (I-1). The obtained aqueous dispersion was applied, by spraying, to a molded polypropylene sheet washed with hot water at 70° C., followed by 30 minutes of drying at 50° C., to give a film of thickness of 10 μm, and further followed by 15 minutes of annealing at the temperature specified in Table 1. On the above coating film, paint composition prepared from 10 parts by weight of a urethane based paint of two liquid type ["Retan PG" (trade name; product by Kansai Paint Co., Ltd.)] and 1 part by weight of a curing agent for "Retan" was applied, followed by 1 hour of drying at 50° C., to give a film of paint composition of thickness of 50 μm, and further followed by annealing at 100° C. The results of paint coating test are shown in Table 1. Also, the results of the heat lamination test are shown in Table 2.

Comparative Example 1

Procedures of Example 1 were repeated except that commercially available aqueous dispersion of chlorinated polypropylene ["Hardlen EH 202" (trade name; product by Toyo Kasei Kogyo Co., Ltd.)] and no aqueous dispersion of polyurethane (II) were used. Obtained aqueous dispersion was subjected to paint coating test. Results are shown in Table 1. Also, the results of heat lamination test are shown in Table 2.

TABLE 1

| Composition | Example 1 | Example 2 | Example 3 | Example 4 | Example 5 | Example 6 | Example 7 | Example 8 | Comparative Example 1 |
|---|---|---|---|---|---|---|---|---|---|
| Aqueous dispersion of a block copolymer [Part by weight[1)]] | (I-1) 100 | (I-1) 100 | (I-1) 100 | (I-1) 100 | (I-2) 100 | (I-3) 100 | (I-4) 100 | (I-1) 100 | — — |
| Aqueous dispersion of chlorinated polypropylene [Part by weight[1)]] | — | — | — | — | — | — | — | — | 100 |
| Aqueous dispersion of a polyurethane [Part by weight[1)]] | (II-1) 60 | (II-2) 60 | (II-3) 60 | (II-4) 60 | (II-1) 60 | (II-1) 60 | (II-1) 60 | (II-1) 60 | — |
| Epoxy compound (wt. %) | 5 | 5 | 5 | 5 | 5 | 5 | 5 | — | 5 |
| Temperature of annealing (° C.) | 110 | 110 | 110 | 110 | 130 | 110 | 110 | 110 | 110 |
| Cross cut tape test | 100 | 100 | 100 | 100 | 100 | 100 | 100 | 100 | 100 |
| Water resistance | 100 | 100 | 100 | 100 | 100 | 100 | 100 | 95 | 90 |
| Resistance to light | 100 | 100 | 100 | 100 | 100 | 100 | 100 | 100 | 70 |

[1)]Weight of solid matter

TABLE 2

| | | Example 1 | Example 4 | Example 6 | Example 7 | Example 8 | Comparative Example 1 |
|---|---|---|---|---|---|---|---|
| Lamination Temperature (° C.) | | 110 | 110 | 110 | 110 | 110 | 100 |
| Peel Strength (g/25 mm) | OPP/OPP | Broken | Broken | Broken | Broken | Broken | Broken |
| | OPP/PET | Broken | Broken | Broken | 0 | Broken | 0 |
| | OPP/PA6 | Broken | Broken | Broken | 0 | Broken | 0 |
| | OPP/EVOH | Broken | Broken | Broken | 0 | Broken | 0 |

Example 9

Aqueous dispersion was prepared by incorporating, into 100 parts by weight (on the solid matter basis) of the aqueous dispersion (I-1), an acrylic emulsion ["Yodosol AD 76" (trade name; solid matter content: 51%; product by Nippon NSC Co., Ltd.)] (hereinafter referred to as "an aqueous dispersion (III-1)"), which is an aqueous dispersion of vinyl polymer (III), in the weight ratio (on the solid matter basis) specified in Table 3 and, further, sorbitol polyglycidyl ether ["Denacol 611" (trade name; product by Nagase Chemical Co., Ltd.), which is an epoxy compound, in the weight ratio (on the solid matter basis) specified in Table 3 relative to the sum of the solid matter in the aqueous dispersion (I-1) and the solid matter in the aqueous dispersion (III-1). The obtained aqueous dispersion was applied, by spraying, to a molded polypropylene sheet washed with hot water at 70° C., followed by 30 minutes drying at 50° C., to give a film of thickness of 10 μm, and further followed by 15 minutes of annealing at the temperature specified in Table 3. On the above coating film, paint composition prepared from 10 parts by weight of a urethane based paint of two liquid type ["Retan PG" (trade name; product by Kansai Paint Co., Ltd.)] and 1 part by weight of a curing agent for "Retan" was applied, followed by 1 hour of drying at 50° C., to give a film of paint composition of thickness of 50 μm, and further followed by annealing at 100° C. The results of paint coating test are shown in Table 3. Also, the results of the heat lamination test are shown in Table 4.

Examples 10 and 11

Procedures of Example 9 were repeated except that amounts of the epoxy compound and the aqueous dispersion of (III-1) were changed as shown in Table 3. Obtained aqueous dispersions were subjected to the paint coating test. Results are shown in Table 3.

Examples 12 to 14

Procedures of Example 9 were repeated except that the aqueous dispersions (I-2) to (I-4) were used instead of the aqueous dispersion (I-1). Obtained aqueous dispersions were subjected to the paint coating test. Results are shown in Table 3.

Example 15

Procedures of Example 9 were repeated except that aqueous dispersion of ethylene-vinyl acetate copolymer ["OM4200" (trade name; product by Kuraray Co., Ltd.)] (hereinafter referred to as "aqueous dispersion (III-2)") was used instead of the aqueous dispersion (III-1). Obtained aqueous dispersion was subjected to the paint coating test. Results are shown in Table 3. Also, results of the heat lamination test are shown in Table 4.

Example 16

Procedures of Example 9 were repeated except that no epoxy compound was used. Obtained aqueous dispersion was subjected to the paint coating test. Results are shown in Table 3. Also, results of the heat lamination test are shown in Table 4.

Comparative Example 2

Procedures of Example 9 were repeated except that commercially available aqueous dispersion of chlorinated polypropylene ["Hardlen EH 202" (trade name; product by Toyo Kasei Kogyo Co., Ltd.)] was used instead of the aqueous dispersion (I-1). Obtained aqueous dispersion was subjected to the paint coating test. Results are shown in Table 3. Also, results of the heat lamination test are shown in Table 4.

TABLE 3

| Composition | Example 9 | Example 10 | Example 11 | Example 12 | Example 13 | Example 14 | Example 15 | Example 16 | Comparative Example 2 |
|---|---|---|---|---|---|---|---|---|---|
| Aqueous dispersion of a block copolymer [Part by weight[1)]] | (I-1) 100 | (I-1) 100 | (I-1) 100 | (I-2) 100 | (I-3) 100 | (I-4) 100 | (I-1) 100 | (I-1) 100 | — — |
| Aqueous dispersion of chlorinated polypropylene [Part by weight[1)]] | — | — | — | — | — | — | — | — | 100 |
| Aqueous dispersion of a vinyl Polymer [Part by weight[1)]] | (III-1) 45 | (III-1) 90 | (III-1) 200 | (III-1) 45 | (III-1) 45 | (III-1) 45 | (III-2) 45 | (III-1) 45 | (III-1) 45 |
| Epoxy compound [wt %] | 5 | 10 | 30 | 5 | 5 | 5 | 5 | — | 5 |
| Temperature of annealing (° C.) | 110 | 110 | 110 | 130 | 110 | 110 | 110 | 110 | 110 |
| Cross cut tape test | 100 | 100 | 100 | 100 | 100 | 100 | 100 | 100 | 100 |
| Water resistance | 100 | 100 | 100 | 100 | 100 | 100 | 100 | 90 | 80 |
| Resistance to light | 100 | 100 | 100 | 100 | 100 | 100 | 100 | 100 | 50 |

[1)]Weight of solid matter

TABLE 4

| | Example 9 | Example 15 | Example 16 | Comparative Example 2 |
|---|---|---|---|---|
| Lamination Temperature (° C.) | 110 | 100 | 110 | 100 |
| Peel Strength (g/25 mm) | | | | |
| OPP/OPP | Broken | Broken | Broken | Broken |
| OPP/PET | Broken | Broken | Broken | 9 |
| OPP/PA6 | Broken | Broken | Broken | 0 |
| OPP/EVOH | Broken | 387 | Broken | 0 |

Examples 17 to 25

Aqueous dispersions were prepared by incorporating, into one of the aqueous dispersions (I-1) to (I-4), a tackifier (IV) and the aqueous dispersion (III-1), the aqueous dispersion (III-2) or the aqueous dispersion (II-1), each in the weight ratio (on the solid matter basis) specified in Table 5 and, further, sorbitol polyglycidyl ether ["Denacol 611 (trade name; product by Nagase Chemical Co., Ltd.), which is an epoxy compound, in the weight ratio (in the solid matter basis) specified in Table 5 relative to the sum of the solid matter in the aqueous dispersion (I-1) to (I-4) and the polyurethane (II-1) or the solid matter in the aqueous to dispersion (III-1)or (III-2). The obtained aqueous dispersions were each applied, by spraying, to a molded polypropylene sheet washed with hot water at 70° C., followed by 30 minutes of drying at 50° C., to give a film of thickness of 10 $\mu$m, and further followed by 15 minutes of annealing at the temperature specified in Table 5. On the above coating film, a paint composition prepared from 10 parts by weight of a urethane based paint of two liquid type ["Retan PG" (trade name; product by Kansai Paint Co., Ltd.)] and 1 part by weight of a curing agent for "Retan" was applied, followed by 1 hour of drying at 50° C., to give a film of paint composition of thickness of 50 $\mu$m, and further followed by annealing at the temperature specified in Table 5. The results of the paint coating test are shown in Table 5. The data of Comparative Example 1 are shown in Table 5. Also, some of the results of the heat lamination test are shown in Table 6.

The following tackifiers (IV) were used:

(IV-1): "Arkon P-100" (trade name; product by Arakawa Chemical Industries Co., Ltd.);

(IV-2): "Escorez 5300" (trade name; product by Tonex Inc.).

TABLE 5

| Composition | Example 17 | Example 18 | Example 19 | Example 20 | Example 21 | Example 22 | Example 23 | Example 24 | Example 25 | Comparative Example 1 |
|---|---|---|---|---|---|---|---|---|---|---|
| Aqueous dispersion of a block copolymer [Part by weight[1)]] | (I-1) 95 | (I-1) 98 | (I-1) 95 | (I-1) 87 | (I-1) 95 | (I-1) 95 | (1-2) 95 | (I-3) 95 | (I-4) 95 | — |
| Aqueous dispersion of chlorinated polypropylene [Part by weight[1)]] | — | — | — | — | — | — | — | — | — | 100 |
| Aqueous dispersion of a vinyl polymer or a polyurethane [Part by weight[1)]] | — — | (III-2) 30 | (III-2) 30 | (III-2) 30 | (III-1) 30 | (II-1) 30 | (III-2) 30 | (III-2) 30 | (II-1) 30 | — |
| Tackifier (Part by weight[1)]) | (IV-1) 5 | (IV-1) 2 | (IV-1) 5 | (IV-1) 13 | (IV-1) 5 | (IV-2) 5 | (IV-1) 5 | (IV-1) 5 | (IV-1) 5 | — |
| Epoxy compound (wt %) | — | 5 | 5 | 5 | 5 | 5 | 5 | 5 | 5 | 5 |
| Temperature of annealing (° C.) | 110 | 110 | 100 | 100 | 100 | 100 | 130 | 110 | 110 | 110 |

TABLE 5-continued

| Composition | Example 17 | Example 18 | Example 19 | Example 20 | Example 21 | Example 22 | Example 23 | Example 24 | Example 25 | Comparative Example 1 |
|---|---|---|---|---|---|---|---|---|---|---|
| Cross cut tape test | 100 | 100 | 100 | 100 | 100 | 100 | 100 | 100 | 100 | 100 |
| Water resistance | 100 | 100 | 100 | 100 | 100 | 100 | 100 | 100 | 100 | 90 |
| Resistance to light | 100 | 100 | 100 | 100 | 100 | 100 | 100 | 100 | 100 | 70 |

[1)]Weight of solid matter

TABLE 6

| | | Example 17 | Example 18 | Example 19 | Example 20 | Example 21 | Example 22 | Example 24 | Example 25 | Comparative Example 1 |
|---|---|---|---|---|---|---|---|---|---|---|
| Lamination Temperature (° C.) | | 100 | 100 | 100 | 100 | 100 | 100 | 100 | 100 | 100 |
| Peel Strength (g/25 mm) | OPP/OPP | Broken | Broken | Broken | Broken | Broken | Broken | Broken | Broken | Broken |
| | OPP/PET | Broken | 361 | Broken | Broken | Broken | Broken | Broken | Broken | 0 |
| | OPP/PA6 | Broken | 560 | Broken | Broken | Broken | Broken | Broken | Broken | 0 |
| | OPP/EVOH | Broken | 493 | Broken | Broken | Broken | Broken | Broken | Broken | 0 |

Reference Example 1

The aqueous dispersion (I-1) was applied, by spraying, to a molded polypropylene sheet washed with hot water at 70° C., followed by 30 minutes of drying at 50° C., to give a film of thickness of 10 μm, and further followed by 15 minutes of annealing at 100° C. On the above coating film, a paint composition prepared from 10 parts by weight of a urethane based paint of two liquid type ["Retan PG" (trade name; product by Kansai Paint Co., Ltd.)] and 1 part by weight of a curing agent for "Retan" was applied, followed by 1 hour of drying at 50 ° C., to give a film of paint composition of thickness of 50 μm, and further followed by annealing at 110° C. The results of the paint coating test are shown in Table 7. Also, the results of the heat lamination test are shown in Table 8.

Reference Example 2

Aqueous dispersion was prepared by incorporating, into the aqueous dispersion (I-1), sorbitol polyglycidyl ether ["Denacol 611 (trade name; product by Nagase Chemical Co., Ltd.)], which is an epoxy compound, in a weight ratio of 5% by weight relative to the solid matter in the aqueous dispersion (I-1).

The obtained aqueous dispersion was applied, by spraying, to a molded polypropylene sheet washed with hot water at 70° C., followed by 30 minutes of drying at 50° C., to give a film of thickness of 10 μm, and further followed by 15 minutes of annealing at 110° C. On the above coating film, a paint composition prepared from 10 parts by weight of a urethane based paint of two liquid type ["Retan PG" (trade name; product by Kansai Paint Co., Ltd.)] and 1 part by weight of a curing agent for "Retan" was applied, followed by 1 hour of drying at 50° C., to give a film of paint composition of thickness of 50 μm, and further followed by annealing at 100° C. The results of paint coating test are shown in Table 7. Also, the results of the heat lamination test are shown in Table 8.

Reference Example 3

Procedures of Reference Example 2 were repeated except that the aqueous dispersion (I-2) was used instead of the aqueous dispersion (I-1) and temperature of annealing of a film of a paint composition was changed to 140° C. Obtained aqueous dispersion was subjected to the paint coating test. Results are shown in Table 7.

Reference Example 4

Procedures of Reference Example 2 were repeated except that the aqueous dispersion (I-3) was used instead of the aqueous dispersion (I-1). Obtained aqueous dispersion was subjected to the paint coating test. Results are shown in Table 7. Also, results of the heat lamination test are shown in Table 8.

TABLE 7

| Composition | Reference Example 1 | Reference Example 2 | Reference Example 3 | Reference Example 4 |
|---|---|---|---|---|
| Aqueous dispersion of a block copolymer [Part by weight[1)]] | (I-1) 100 | (I-1) 100 | (I-2) 100 | (I-3) 100 |
| Epoxy compound (wt %) | — | 5 | 5 | 5 |
| Temperature of annealing (° C.) | 100 | 110 | 140 | 110 |
| Cross cut tape test | 100 | 100 | 100 | 100 |
| Water resistance | 90 | 100 | 100 | 100 |
| Resistance to light | 100 | 100 | 100 | 100 |

[1)]Weight of solid matter

TABLE 8

| | Reference Example 1 | Reference Example 2 | Reference Example 4 |
|---|---|---|---|
| Lamination Temperature (° C.) Peel Strength (g/25 mm) | 110 | 110 | 110 |
| OPP/OPP | Broken | Broken | Broken |
| OPP/PET | Broken | Broken | Broken |
| OPP/PA6 | Broken | 453 | Broken |
| OPP/EVOH | 412 | 347 | 388 |

Having now fully described the invention, it will be apparent to one of the ordinary skill in the art that many changes and modifications can be made thereto without departing from the spirit or scope of the invention as set forth herein.

This application is based on Japanese Patent Application Nos. 2000-196818, filed on Jun. 29, 2000, 2000-196819, filed on Jun. 29, 2000 and 2001-13941, filed on Jan. 13, 2001, the entire contents of each which are hereby incorporated by reference.

What is claimed is:

1. An aqueous dispersion, comprising:
   (i) an aqueous dispersion of a block copolymer (I) comprising:
      at least one polymer block (A) consisting essentially of olefin monomer units; and
      at least one polymer block (B) consisting essentially of 2 to 100 mole percent of units derived from at least one vinyl monomer having a carboxyl group or carboxylic anhydride group and 98 to 0 mole percent of units derived from another vinyl monomer or monomers copolymerizable with the carboxyl group- or carboxylic anhydride group-containing vinyl monomer, in an aqueous solution of not less than 0.05 equivalent, relative to the carboxyl or carboxylic anhydride group, of a basic substance, and
   ii) a polyurethane (II) incorporated in the aqueous dispersion (I);
   wherein said polyurethane (II) is a polyurethane having a neutralized carboxyl group or a monovalent or divalent aliphatic hydrocarbon group containing 50 to 1,000 carbon atoms and/or a polyurethane which is a composite polyurethane obtained by polymerizing a vinyl monomer in the presence of a polyurethane.

2. The aqueous dispersion as claimed in claim 1, wherein a weight ratio between the solid matter in the aqueous dispersion (I) and the polyurethane (II) is 10:90 to 90:10.

3. The aqueous dispersion as claimed in claim 1, which further comprises a tackifier (IV).

4. The aqueous dispersion as claimed in claim 3, wherein a weight ratio of the solid matter in the aqueous dispersion (I) to the tackifier (IV) is 99.9:0.1 to 50:50.

5. The aqueous dispersion as claimed in claim 3, wherein the tackifier (IV) is a hydrogenated petroleum resin.

6. A coating composition, comprising the aqueous dispersion as claimed in claim 3.

7. A primer, comprising the aqueous dispersion as claimed in claim 3.

8. An adhesive composition, comprising the aqueous dispersion as claimed in claim 3.

9. The aqueous dispersion as claimed in claim 1, which further comprises a curing agent.

10. The aqueous dispersion as claimed in claim 9, wherein the curing agent is an epoxy compound.

11. The aqueous dispersion as claimed in claim 9, wherein the curing agent is present in an amount of 0.2 to 20% by weight based on a total solid matter in the aqueous dispersion.

12. The aqueous dispersion as claimed in claim 1, which further comprises 1 to 200 parts by weight of an olefin polymer per 100 parts by weight of the block copolymer (I).

13. A coating composition, comprising the aqueous dispersion as claimed in claim 1.

14. A primer, comprising the aqueous dispersion as claimed in claim 1.

15. An adhesive composition, comprising the aqueous dispersion as claimed in claim 1.

16. An aqueous dispersion, comprising:
   i) an aqueous dispersion of a block copolymer (I) comprising:
      at least one polymer block (A) consisting essentially of olefin monomer units; and
      at least one polymer block (B) consisting essentially of 2 to 100 mole percent of units derived from at least one vinyl monomer having a carboxyl group or carboxylic anhydride group and 98 to 0 mole percent of units derived from another vinyl monomer or monomers copolymerizable with the carboxyl group- or carboxylic anhydride group-containing vinyl monomer, in an aqueous solution of not less than 0.05 equivalent, relative to the carboxyl or carboxylic anhydride group, of a basic substance, and
   ii) a tackifier (IV) incorporated in the aqueous dispersion (I).

17. The aqueous dispersion as claimed in claim 16, wherein a weight ratio of the solid matter in the aqueous dispersion (I) to the tackifier (IV) is 99.9:0.1 to 50:50.

18. The aqueous dispersion as claimed in claim 16, wherein the tackifier (IV) is a hydrogenated petroleum resin.

19. The aqueous dispersion as claimed in claim 16, which further comprises a curing agent.

20. The aqueous dispersion as claimed in claim 19, wherein the curing agent is an epoxy compound.

21. The aqueous dispersion as claimed in claim 19, wherein the curing agent is present in an amount of 0.2 to 20% by weight based on a total solid matter in the aqueous dispersion.

22. The aqueous dispersion as claimed in claim 16, which further comprises 1 to 200 parts by weight of an olefin polymer per 100 parts by weight of the block copolymer (I).

23. A coating composition, comprising the aqueous dispersion as claimed in claim 16.

24. A primer, comprising the aqueous dispersion as claimed in claim 16.

25. An adhesive composition, comprising the aqueous dispersion as claimed in claim 16.

* * * * *